Patented June 20, 1944

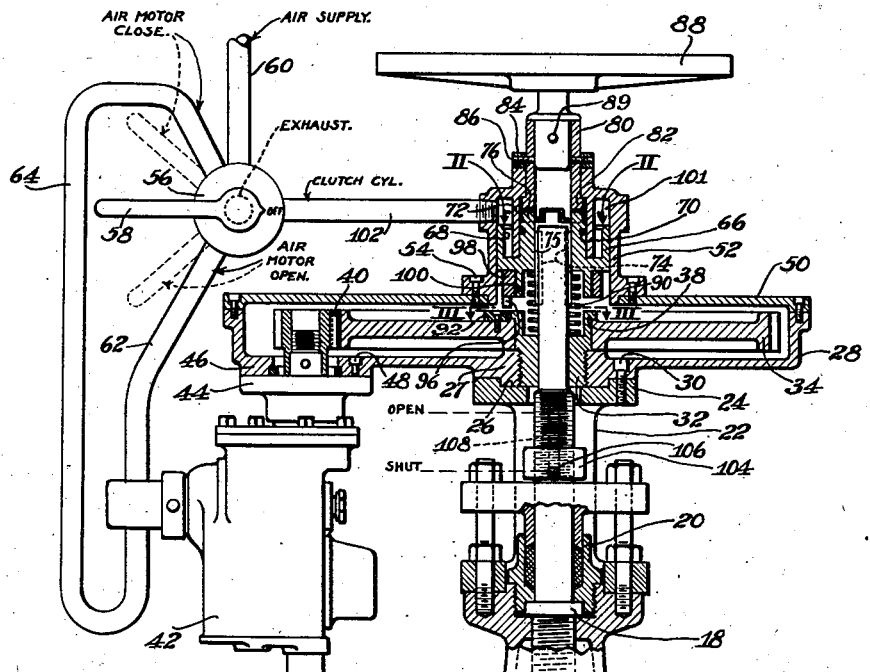

2,352,140

UNITED STATES PATENT OFFICE 2,352,140

POWER-OPERATED VALVE

Arthur J. Trott, Greensburg, Pa., assignor to Walworth Patents Inc., Boston, Mass., a corporation of Massachusetts Application March 28, 1942, Serial No. 436,581

6 Claims. (Cl. 74—407)

This invention relates to power operated apparatus and more particularly to power actuated apparatus having provision for manual actuation.

One of the objects of this invention is to permit automatic change-over from one form of actuation to the other with convenience and safety.

Another object of the invention is to render it impossible to operate a valve by power without first disconnecting the manual operating means.

Other objects and advantages will become apparent from the following description taken in connection with the accompanying drawing wherein:

Fig. 1 is a front elevation partly in section of a gate valve showing the invention applied thereto.

Fig. 2 is a section taken on the line II—II of Fig. 1, and

Fig. 3 is a section taken on the line III—III of Fig. 1.

Referring more particularly to the drawing it will be seen that the invention is illustrated as being applied to a gate valve of the non-rising stem type having a body 10 provided with a passage therethrough controlled by reciprocating movements of the gate member 12. Threadedly engaging with the gate member 12 is a valve stem 14 which projects through the bonnet 16 of the valve body 10 and is provided with the usual collar 18 engaged by the nut 20 secured to the bonnet 16 and by means of which the stem 14 is prevented from partaking of the reciprocating movements of the gate 12. The bonnet 16 carries a yoke member 22 terminating in an annular cap 24 through which the stem 14 projects.

The cap 24 may be recessed, as at 26, for the reception of the hub portion 27 of a cup-shaped gear housing 28 secured to the cap by means of the screws 30. The hub portion 27 of the housing 28 is provided with internal threads for engagement with the threaded end of a hollow bearing element 32 which is mounted on the projecting end of the stem 14. Rotatably mounted on the bearing element 32 is a spur gear 34 the hub of which rests on the threaded hub portion 27 of the housing 28. The gear 34 is maintained in position against axial movement by the provision of an enlarged head 38 on the bearing element 32 which overlies the hub of the gear 34.

Power operation of the valve may be effected by rotation of the gear 34 through suitable connection with power driving means. In this instance, the gear 34 meshes with a pinion 40 carried by the driving shaft of a fluid operated motor 42 of any suitable construction. The motor may be suspended from the housing 28 by engagement of a flange 44 thereon with a suitable facing or pad 46 formed on the underside of the gear housing 28 at a point offset from the axis thereof and secured thereto by means of the screws 48. A cover 50 is secured to the housing 28 and provided with an opening for the reception of a clutch housing 52 secured thereto by means of the screws 54 and into which the stem 14 projects.

The fluid operated motor 42 may, in this instance, be an air motor arranged to be driven selectively in opposite directions by manipulation of a suitable multi-way valve mechanism 56. As will be apparent hereinafter the motor 42 and its control valve mechanism 56 form no part of the present invention in respect to details of construction or mode of operation. As indicated in Fig. 1, the control valve 56 should be constructed so that manipulation of its operating handle 58 from an "off" to an "open" position will permit pressure fluid, such as compressed air, to flow from the air supply pipe 60 through the valve mechanism 56 to the inlet pipe 62 leading to the air motor 42. The valve stem 14 will thereupon be driven through the gearing and through novel clutching means to be described, in a counter-clockwise direction to cause opening of the valve gate 12. When the handle 58 is moved to the "close" position, as indicated in Fig. 1, the pressure fluid will flow from the supply pipe 60 through the inlet pipe 64 also leading to the air motor 42. The valve stem 14 will then be rotated in the reverse direction to cause movement of the valve gate 12 to close the passageway through the valve body 10. During the time that the handle 58 remains in the "close" position, the pipe 62 is connected through the valve mechanism 56 to exhaust the pressure fluid therein and a similar connection to exhaust may be made from the pipe 64 when the handle 58 is moved to the "open" position. Thus, any of the various multi-way valves common to the art may be used to perform the desired functions.

This invention is more particularly directed toward the provision of means for providing joint manual and power actuation for the valve described while rendering it impossible to operate the valve by the power means without first automatically disconnecting the manual operating means. To this end, a hollow clutch piston 66 is provided in the clutch housing 52 having formed in one face thereof an annular recess 68. The inner wall of the recess 68 is provided with a packing ring 70 having sealing engagement with a projecting collar 72 formed on the inner end face of the clutch housing 52. The piston 66 is secured to the projecting end of the stem 14 for slidable but non-rotatable movement relative thereto by means of keys 74 projecting from the valve stem 14 into suitable keyways formed in the inner wall 75 of the hollow piston 66.

The annular end face of the piston 66, defined by the inner wall of recess 68 and inner wall 75, is provided with a set of clutch elements 76 adapted to engage complementary clutch elements 78 projecting from a clutch collar 80 surmounting the piston 66 and having a portion extending exterior of the clutch housing 52. The clutch collar 80 is held against axial movement with respect to the clutch housing 52 by the provision of a head 82 on the end within the clutch housing 52 and a collar 84 seated on the end of the clutch housing 52 and secured to the clutch collar 80 by means of the screws 86. The projecting end of the clutch collar 80 provides a socket for the reception of the spindle of a handwheel 88 secured thereto by means of the rivet or locking pin 89.

The piston 66 which overlies gear 34 is normally spaced therefrom by means of a coil spring 90 extending between the bearing element 32 and the piston 66, there being suitable recesses provided in these members and forming an annular space around the valve stem for the reception of this spring 90. Hence, when the handwheel 88 is rotated, concurrent rotation of the stem 14 will occur due to the clutch connections previously described. During such manual operation of the valve, rotation of the gear 34 due to simultaneous operation of the motor 42 would have no effect upon the valve stem 14, as the gear 34 is journaled on the bearing element 32. Hence, in order to connect the gear 34 to drive the valve stem 14 upon power actuation of the valve, the gear 34 is provided with a driving element 92. This element 92 may be integral with the gear 34 but, in this instance, is shown as in the form of a separate segment secured to the gear 34 by screws 94 and slightly spaced from the enlarged head 38 on the bearing element 32. The piston 66 is provided with a complementary driving member 96 for element 92 and this member also may be integral therewith but, in this instance, is shown as carried by an eccentric collar 98. The collar 98 is threaded upon the end of the piston 66 which is suitably recessed leaving an annular end portion 100 housing the coil spring 90. In order to cause axial movement of the piston 66 to engage the driving member 96 thereon with driving member 92, a suitable supply pipe 102 may extend from the motor control valve mechanism 56 to the clutch housing 52 to discharge pressure fluid into the annular space 101 above the piston 66. Any suitable means may be incorporated in the valve mechanism 56 to cause flow of pressure fluid through the pipe 102 whenever the control handle 58 is moved either to the "open" or "close" positions. In this manner the driving element 96 is moved downwardly into the plane of the driving element 92 whenever actuation of the motor 42 occurs and the manual operating means is automatically disconnected from driving engagement with the valve stem 14.

It will be observed that considerable rotary travel of the driving element 92 normally will occur before this element will engage with the driving member 96 in either direction of rotation of the gear 34. Thus, due to such lost motion an impact is given to the valve stem at the inception of power actuation of the valve so that if the gate 12 is stuck or frozen to its seat or is jammed in any operating position it can readily be freed for normal operation.

In non-rising stem gate valves of the type described and shown the position of the gate is usually indicated by suitable means visible from the valve exterior. Such means may take the form of a threaded collar 104 located on the valve stem 14 within yoke 22 and having a pointer 106 which enters a slot 108 formed in one arm of the yoke. Thus, the collar being prevented from rotating on the stem will rise and drop thereon in accordance with movements of the gate 12 and indicate whether the latter is in open or closed position.

The clutching arrangement of the present invention may be equally well applied to globe valves wherein the stem travels a short distance during opening and closing movements. In such applications the indicator means described would be dispensed with so that reciprocation through the bearing element 32 could occur. Such variations are thought to be obvious and are contemplated as being within the scope of this invention.

The operation of the device will be clear from the foregoing description from which it will be apparent that rotation of the handwheel 88 for manual actuation of the valve can be conducted whenever the piston 66 is in its uppermost position. When the control valve 56 is operated to introduce pressure fluid above the piston 66 and simultaneously to actuate the motor 42, the piston will be moved downwardly to disengage the clutching elements 76 and 78 whereupon no further manual actuation can occur. It will thus be apparent that either manual or power actuation can be utilized to operate the valve and that the change-over from one to the other may be made with ease and safety. The embodiment is merely illustrative and many changes may be made in the details of construction without departing from the spirit and scope of the invention as defined by the appended claims.

I claim:

1. In a power operated apparatus, a rotatable stem, a manually operated device for rotating said stem, a power operated device for rotating said stem, each said device having a driving connection spaced from the other, driving means slidable on said stem between said connections for establishing operative engagement between one device and the stem while simultaneously disengaging the other, means biasing said driving means into operative engagement with said manually operated device, and means for applying power to said power operated device and coincidentally to said driving means for overcoming said biasing means.

2. In a power operated apparatus, a rotatable stem, a manually operable device mounted for relative rotation on said stem, a power operated device mounted for relative rotation on said stem, each device having a driving connection spaced from the other, driving means slidably and non-rotatably mounted on said stem between said connections for establishing operative engagement between one device and the stem while simultaneously disengaging the other, a source of power, means connected to said source for operating said power operated device, and means having separate connection with said source for operating said driving means.

3. In a power operated apparatus, a rotatable stem, manual operating means for rotating said stem, power operating means for performing the function of said manual means, driving means common to both said manual and power means and secured against rotation relative to said stem, means for biasing said driving means into operative engagement with one operating means and out of engagement with the other, and means for reversing said operative engagement upon inception of said power operation.

4. Combined manual and power actuation for apparatus having a rotatable, non-rising stem, comprising a driving gear mounted for relative rotation on said stem, pressure fluid means for rotating said gear, a handwheel surmounting said gear and rotatable relative thereto and to said stem, toothed portions on said handwheel and gear, a sliding dog secured against rotation relative to said stem and located between said handwheel and gear, means normally biasing said dog into driving engagement with the toothed portion of said handwheel for imparting manual actuation to said stem, and means for moving said dog by pressure fluid out of engagement with said handwheel and into engagement with the toothed portion of said gear for imparting power actuation to said stem.

5. In a power operated apparatus, a rotatable non-rising stem, a cylinder mounted on said stem, a piston in said cylinder having slidable and non-rotatable engagement with said stem, an attachment for supplying pressure fluid to the cylinder on one side of said piston for slidable movement thereof, a driving gear mounted for relative rotation on said stem opposite the pressure fluid side of said piston, pressure fluid actuated means for rotating said gear, interengaging means on said piston and gear for imparting rotation of one to the other, a handwheel for said stem, means on said pressure fluid side of the piston for securing the handwheel to the cylinder for rotation relative thereto, interengaging means on said piston and the last said means for imparting rotation of one to the other, and yieldable means between said piston and gear for normally maintaining said handwheel interengaging means connected and the other interengaging means disconnected, said yieldable means permitting reversal of said connections upon application of pressure fluid to said piston.

6. In a power operated apparatus, a casing having a rotatable stem extending therefrom, a gear housing mounted in said casing, a bushing secured to said housing around said stem, a gear journaled on said bushing, means for rotating said gear by pressure fluid operation, a cylinder mounted on said gear housing, a piston in said cylinder having slidable and non-rotatable engagement with said stem, an attachment from said pressure fluid means for supplying pressure fluid to the cylinder on one side of said piston for slidable movement thereof, means for imparting rotation of said gear to said piston and thus to the stem, said means comprising a pair of lugs adapted to interengage after lost motion therebetween for creating an impact, a handwheel for said stem, means interengaging said handwheel and the piston for imparting manual rotation to said stem, and a spring extending between said bushing and piston for normally maintaining the last said means engaged until pressure fluid operation is initiated and slidable movement of the piston occurs.

ARTHUR J. TROTT.